United States Patent [19]

Yokoyama et al.

[11] Patent Number: 4,952,775
[45] Date of Patent: Aug. 28, 1990

[54] FLOOR HEATING PANEL

[75] Inventors: Seiko Yokoyama, Yahata; Hikomi Tanooka, Kadoma; Minoru Hibino, Katano; Junichi Arakawa, Hirakata, all of Japan

[73] Assignee: Matsushita Electric Works, Ltd., Japan

[21] Appl. No.: 323,368

[22] Filed: Mar. 14, 1989

[30] Foreign Application Priority Data

May 14, 1988 [JP] Japan ............................ 63-63722[U]
Aug. 26, 1988 [JP] Japan ................................ 63-212930

[51] Int. Cl.⁵ ............................................. H05B 3/34
[52] U.S. Cl. ..................................... 219/213; 174/48; 219/345; 219/541; 439/33
[58] Field of Search ...................... 219/213, 345, 541; 439/32, 33; 361/353, 354, 355, 426; 174/48, 49

[56] References Cited

U.S. PATENT DOCUMENTS

| 3,095,491 | 6/1963 | Deacon | 219/345 |
| 3,223,775 | 12/1965 | Nugent | 219/345 |
| 3,598,960 | 8/1971 | Deacon | 219/213 |
| 4,204,106 | 5/1980 | Colten | 219/213 |
| 4,480,175 | 10/1984 | Brasky | 219/345 |
| 4,677,801 | 7/1987 | Bard | 52/389 |

FOREIGN PATENT DOCUMENTS

| 2607949 | 9/1977 | Fed. Rep. of Germany | 219/213 |
| 119121 | 7/1984 | Japan | 219/345 |

Primary Examiner—A. D. Pellinen
Assistant Examiner—Geoffrey S. Evans
Attorney, Agent, or Firm—Stevens, Davis, Miller & Mosher

[57] ABSTRACT

A floor heating panel made of wood, a heating element on the top of the wood, a covering layer placed over the heating element to cover the entire top surface of the wood, and a cushioning layer beneath the wood. The wood has on its bottom surface a row of slits to allow the wood to resiliently flex to a limited extent. The floor heating panel has two connectors that are slidably along one dimension of the heating panel between inner and outer stop elements.

9 Claims, 5 Drawing Sheets

FLOOR HEATING PANEL

BACKGROUND OF THE INVENTION

1. Field of the Invention

The present invention is directed to a floor heating panel adapted in use to be laid over a floor for space heating.

2. Description of the Prior Art

A conventional floor heating panel is known in which a flat heating element is sandwiched between a rigid substrate and a top cover member. The rigid substrate which is for example made of a wooden material causes a problem when the panels are placed on an uneven subfloor. In such case, the bulges on the uneven subfloor act on the heating element through the rigid substrate to thereby give a considerable stress thereto which may be harmful to the safe heating. Further, it is largely possible with such uneven subfloor that the panel suffers from separation or warp which may cause squeaks in floors.

SUMMARY OF THE INVENTION

The present invention eliminates the above problem by the use of a cushioning layer on the bottom of a heating panel. The heating board in accordance with the present invention comprises a substrate made of a wooden material, a flat heating element arranged over the top surface of the substrate, and a cover or protective layer placed over the heating element. The substrate is backed with the cushioning layer which is made of, for example, foamed polyethylene, foamed rubber, rubber, or felt-fabric having enough flexibility to absorb any substantial surface irregularity of a subfloor across which the heating panels are laid. Thus, the cushioning layer can absorb the surface irregularity of the subfloor to thereby provide a flush flooring arrangement.

Accordingly, it is a primary object of the present invention to provide a floor heating panel which can be laid over a subfloor without causing separation or warp even in the presence of considerable surface irregularity on the subfloor.

The substrate is preferably formed in its bottom surface with rows of grooves by which it is allowed to flex to a limited extent. Thus, the substrate itself can be easily to conform to even a minor curvature of the subfloor, which in addition to the cushioning effect by the cushioning layer serves to provide an intimate contact between the heating panel and the subfloor, avoiding the separation and the gap therebetween.

It is therefore another object of the present invention to provide a floor heating panel which is capable of being successfully laid even over the curved subfloor.

The heating element is of flat-configuration comprising a patterned foil of electrical resistor element which is thin enough to be resilient so that it is free from any harmful stress even when it is deformed together with the substrate when installed on a curved supporting surface.

It is therefore a further object of the present invention to provide a floor heating panel of which heating element can be kept harmless to assure a safe floor heating.

In a preferred embodiment, the substrate is provided with a terminal unit for electrical connection of the heating element to a source of electric power and also to another heating panel of the like construction. The substrate is formed with a recess for accommodating therein the terminal unit so that the terminal unit can be received and concealed within the thickness of the panel without causing any projection on the bottom of the panel. Thus, the floor heating panel can be successfully laid flat on a subfloor as well as directly across joists, which is therefore a further object of the present invention.

The terminal unit includes at least one connector which is slidable along one dimension of the substrate and has lead jacks for receiving conductors of a cable leading to the source of electric power and to the adjacent panel of the like construction. Thus, the wiring connection can be made in such a manner that the connector is firstly moved to its outermost position or readily accessible position at which conductors of the cable are inserted into the corresponding lead jacks and then the connector is left free to move inwardly so that the portion of the cable can be withdrawn together with the connector into the panel. This serves to minimize the length of the cable left exposed externally of the panel, particularly those left extending between the adjacent panels, assuring neat wiring connection yet facilitating the wiring operation.

It is therefore a still further object of the present invention to provide a floor heating panel which is capable of reducing the length of the cable projecting outwardly of the panel for facilitating to arrange the panels in rows yet assuring convenient wiring connections.

The present invention discloses further advantageous arrangements such as to hold the connector in its outermost position at the wiring connecting operation and to guide the connector by utilization of a bottom plate closing the recess in which the terminal unit or the connector is received.

These and still other advantageous features will become more apparent from the following description of the preferred embodiments of the present invention when taken in conjunction with the attached drawings.

DESCRIPTION OF PREFERRED EMBODIMENTS

First embodiment FIGS. 1 to 4

Figure 1:
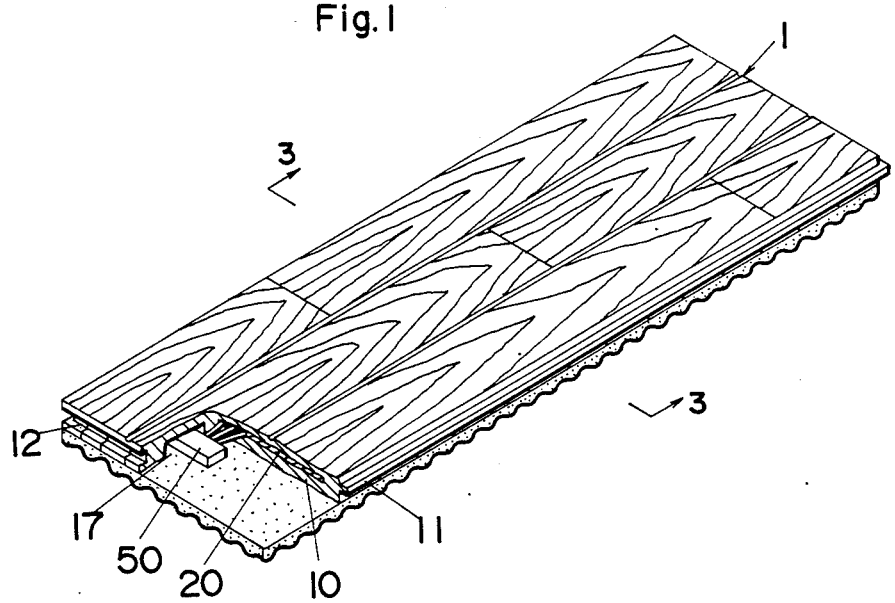
FIG. 1 is a perspective view of a floor heating panel with a portion being cut away in accordance with a first embodiment of the present invention.
Figure 3:
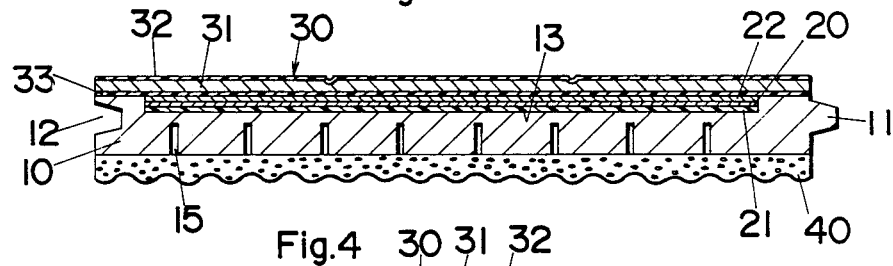
FIG. 3 is a sectional view taken along line 3—3 of FIG. 1.
Figure 4:
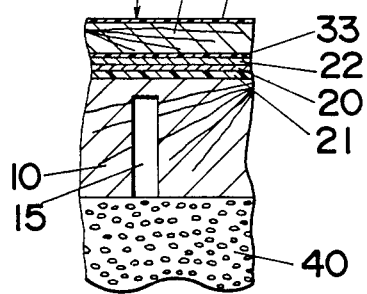
FIG. 4 is an enlarged sectional view of a portion of FIG. 3.

Referring to FIG. 1, there is shown a floor heating panel in accordance with a first embodiment of the present invention which is a rectangular panel, for example measuring 3 ft.×1 ft. A plurality of the panels 1 are installed over a subfloor 5 with their ends and sides butted together. To this end, each panel 1 has a tongue 11 and a groove 12 along its sides and ends. As shown in FIGS. 3 and 4, the panel 1 Comprises a substrate 10 made of a wooden material such as a plywood or the like hard wood which is formed in its upper surface with an enlarged shallow cavity 13 extending over the substantial top surface of the panel 1 for receiving an electric heating element 20. The heating element 20 is provided in the form of a flat resilient member comprises a patterned foil sandwiched between electrically insulative plastic films (not shown). The heating element 20 is disposed over the entire bottom of the cavity 13 with a flexible protective sheet 21 of fire-resistant material interposed therebetween. Disposed on the heating element 20 is a thin heat-diffusing plate 22 of stainless steel which extends over the entire surface of the heating element 20 for effecting uniform heating over the top surface of the panel 1. A top cover 30 is stacked on the heat-diffusing plate 22 and secured thereto by adhesive 33. The top cover 30 comprises a resin-containing plywood 31 frequently referred to as a wood-plastic-combination material exhibiting natural grain and a transparent coat 32 of urethane resin. The top cover 30 has a thickness of about 3.0 mm. The typical thicknesses for the substrate 10, the heater assembly of the protective sheet 21, heating element 20, and heat-diffusing sheet 22, and that for the top cover 30 are respectively 10.3 mm, 1.5 mm, and 3.0 mm.

The substrate lo is backed with a cushioning layer 40 made of foamed rubber or the like elastic material having enough deformability to absorb surface irregularities possibly present on the subfloor 5. The cushioning layer 40 has normal thickness of about 8.0 mm, which may vary depending upon the surface condition of the subfloor. The substrate 10 is formed in its bottom surface with a grid of slits 15 by which it is given a limited deformability as well as acoustic insulative performance. Preferably, the slits 15 each having 3.0 mm width and 9.0 mm depth are spaced at an interval of 60 mm in the lengthwise as well as width directions of the panel. Since the substrate 10 as well as the heater assembly are formed to have limited deformability, the panels 1 can be easily deformed so as to fit a somewhat great curvature of the subfloor surface to such an extent that the cushioning layer 40 alone fails to absorb the curvature or surface irregularity of the subfloor.

Figure 2:
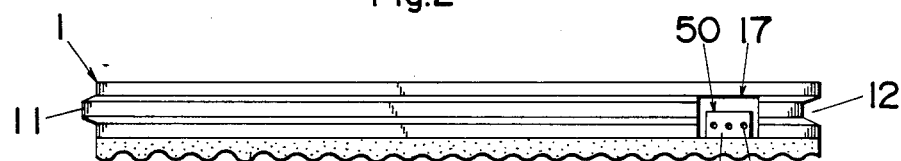
FIG. 2 is a side view of the above floor heating panel.

Formed at the one longitudinal end of the substrate 10 is slot 17 which extends transversely to open at the both sides and accommodates therein a terminal unit 50 for electrical connection of the heating element 20 to a source of electric power and to the adjacent panel. The terminal unit 50 includes a pair of connectors 70 (only one of which is shown in FIG. 2) with lead jacks 71 for rapid connection with conductors of a cable leading to the power source or the adjacent panel.

Figure 5:
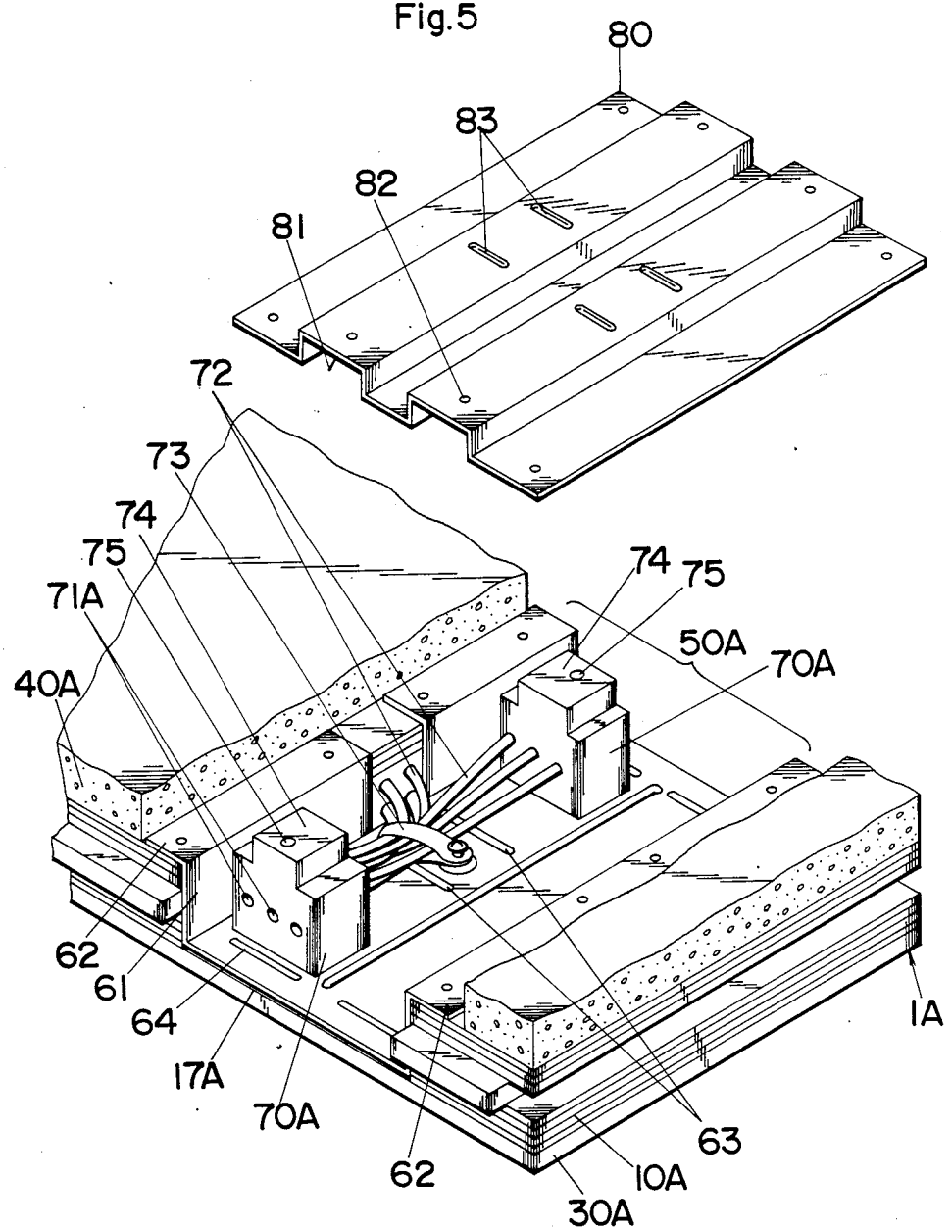
FIG. 5 is an exploded perspective view illustrating a terminal unit utilized in a floor heating panel in accordance with a modification of the first embodiment.
Figure 6:
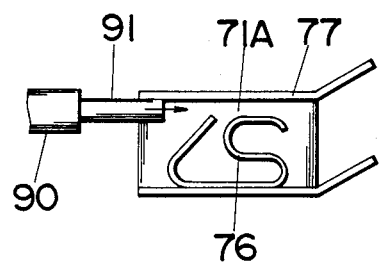
FIG. 6 is a schematic view of a connector utilized in the terminal unit of FIG. 5.
Figure 7:
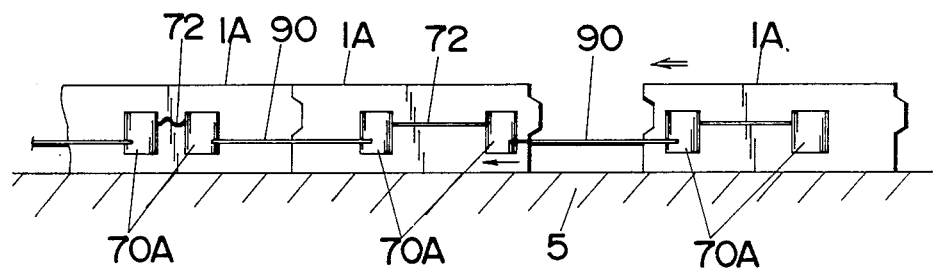
FIG. 7 is a schematic view illustrating the way that the panels are connected to each other.

Modification of the first embodiment FIGS. 5 to 7

FIG. 5 shows a modification of the above embodiment which is similar in construction to the fist embodiment except that an improved terminal unit 50A is utilized. The terminal unit 50A is received in a slot 17A which is formed in the lower surface of the like substrate 10A to extend the full width of the substrate 10A adjacent one longitudinal end thereof, leaving access openings at the respective ends of the slot 17A. The terminal unit 50A includes a channel member 61 received in the slot 17A with its flanges 62 secured to the lower surface of the substrate 10A, a pair of connectors 70A each slidable along the channel member 61 or in the transverse direction of the panel 1A, and a bottom cover 80 secured to the channel member 61 to close the bottom of the slot 17A. Each connector 70A is wired to the like flat heating element (not seen) on the substrate 10A by cords 72 extending into the middle of the channel member 61 and held thereat by means of strain relief band 73. Formed in the outer face of each connector 70A is a set of lead jacks 71A for electrical connection of the heating element to a source of electric power or to that of an adjacently disposed panel. Each connector 70A is held between the channel member 61 and the bottom cover 80 with its bottom projection 74 slidably received in a furrow 81 of the bottom cover 80 so that it is slidable in the width direction of the panel over a distance defined by an inner stop 63 and an outer stop 64 both formed integrally on the channel member 61. Each connector 70A has in its projection 74 a screw hole 75 into which a screw is inserted through corresponding hole 82 in the outer end of the bottom cover 80 for retaining the connector 70A at its outermost position. The bottom cover 80 is also formed with stop indents 83 which correspond respectively to the inner stops 63 of the channel member 61 to be cooperative therewith to form effective stops to the inward movement of the connector 70A. The half of the space formed between the channel member 61 and the bottom cover 80 is reserved for accommodating another pair of connectors (not shown) which are of the like configuration and utilized, for example, for electrical interconnection of a control signal line which may be utilized for temperature control of the heater.

Electrical connection of the panels 1A at the time of the installation can be made as shown, for example, in FIG. 7. The panels 1A are laid on the subfloor 5 in side-by-side relation and electrically interconnected between the adjacent panels 1A while the first panel being connected to the source of power by the use of rather stiff cables 90. Connection of the cable 90 to each connector 70A is made through the steps of firstly moving the connector 70A to its outermost positions and retaining thereat by a screw extending into the screw hole 75 of the connector 70A from the bottom cover 80, inserting the conductors 91 of the cable 90 into the lead jacks 71A, as shown in FIGS. 6, to complete the electrical connection, and thereafter removing the screw to leave the connector 70A free to move inwardly. Thus, the connector 70A is be allowed to retard into the panel 1A together with the substantial portion of the cable 90, whereby minimizing the length of the cables left projecting outwardly of the panel 1A and therefore providing a neat connection between the panels 1A, as schematically shown in FIG. 7. The bottom cover 80 may be covered by the integral portion of the cushioning layer 40A or by a cushioning pad separately formed from the cushioning layer 40A.

As shown in FIG. 6, the lead jack 71A comprises a catch spring 76 received in a sheath 77 electrically connected to the cord 72 leading to the heating element. The catch spring 76 is biased to grip the conductor 91 of the cable 90 between the catch spring 76 and the portion of the sheath 77. The front end of the catch spring 76 is inclined rearward so as to allow the conductor 91 to be readily inserted in the lead jack 71A and at the same time to be firmly connected thereto.

Second embodiment FIGS. 8 to 11

Figure 8:
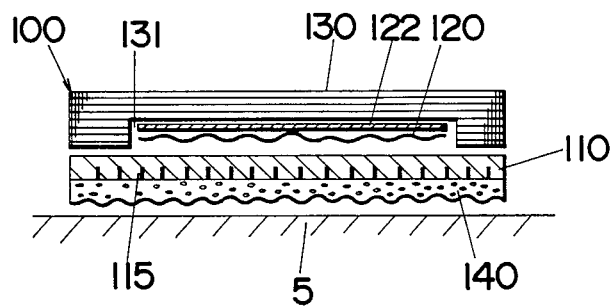
FIG. 8 is an exploded sectional view of a floor heating panel in accordance with a second embodiment of the present invention.

Referring to FIG. 8, there is shown a floor heating panel 100 in accordance with a second embodiment of the present invention which comprises a rectangular substrate 110 with the like tongue and groove on its periphery, a flat electric heater 120, a top cover 130 of wooden material, and a cushioning layer 140 of the like material as utilized in the first embodiment. The top cover 130 is made of a plywood provided in its bottom surface with a shallow cavity 131 for receiving therein the flat heater 120 together with a heat diffusion plate 122. The flat heater 120 is of the same type utilized in the first embodiment composed of a patterned foil sandwiched between plastic films and electrically connected to a terminal unit 150 provided in one longitudinal end of the substrate 110. The substrate 110 in this embodiment is also formed in its bottom surface with a grid of slits 115 by which it is given a limited deformability as well as acoustic insulative performance as discussed in the first embodiment.

Figure 9:
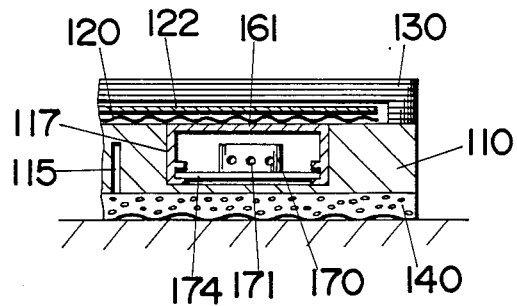
FIG. 9 is a partial sectional view illustrating a portion of the heating panel of FIG. 8.
Figure 10:
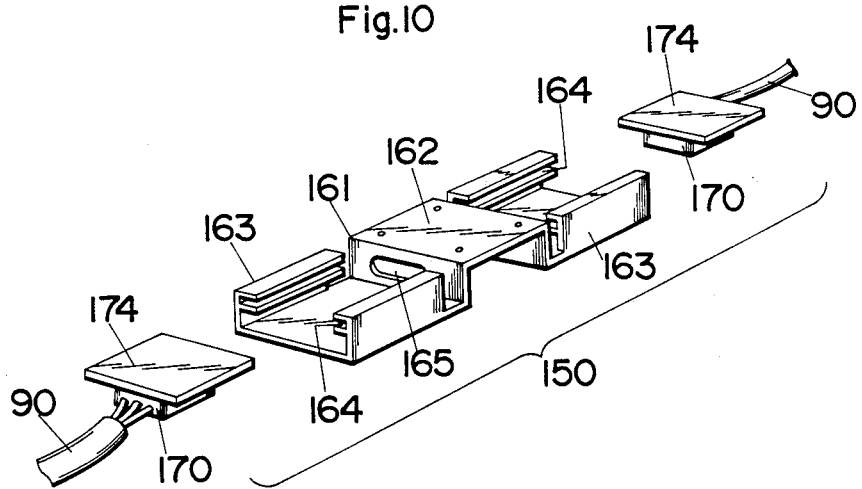
FIG. 10 is an exploded perspective view of a terminal unit utilized in the panel of FIG. 9.

As shown in FIGS. 9 and 10, the terminal unit 150 comprises a base frame 161 and a pair of connectors 170 slidably supported therein. The base frame 161 is received in a transversely extending slot 117 open and is secured at its center plate 162 to the bottom of the slot 117 such as by screws (not shown). Extending in the opposite directions respectively from the center plate 162 are a pair of channel sections 163 along which the connectors 170 are movable. Each connector 170 is fixed on a slider 174 and is slidably supported to the channel section 163 with the edges of the slider 174 received in corresponding grooves 164 of the channel section 163. The connector 170 has the like lead jacks 171 as in the first embodiment for connection with an external cable 90 and internally connected to the heater 120 by means of cords 172 (only shown in FIGS. 11A to 11C) routed through a hole 165 at the juncture between the center plate 162 and the channel section 163.

Figure 11A:
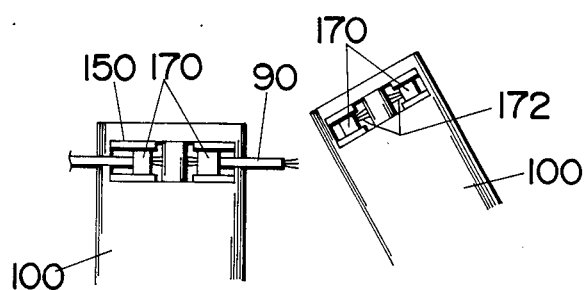
FIGS. 11A to 11C are schematic views illustrating the electrical connections between the adjacent panels of FIG. 8.
Figure 11B:
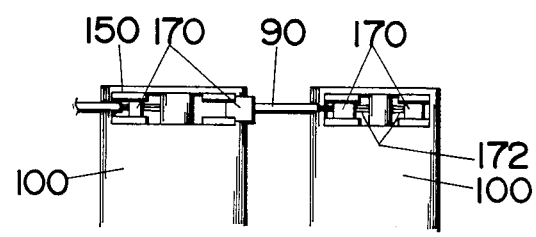
Figure 11C:
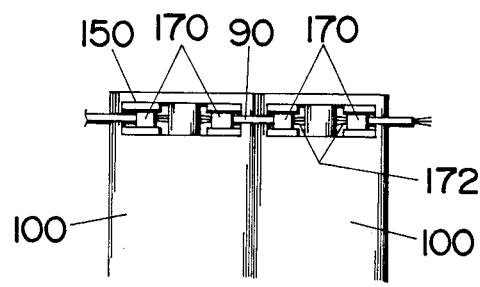

The connection between the adjacent panels 100 at the installation is made in the like manner as in the first embodiment. That is, as shown in FIGS. 11A to 11, the connector 170 of the panel 100 already installed is moved outwardly by pulling a cable 90 already connected thereto, while the connector 170 of the panel 100 being installed is moved to its outermost position at which individual conductors of the cable 90 from the adjacent panel 100 are inserted into the lead jacks 171 to complete the electrical connection (FIG. 11B). Then, the panel 100 is laid close to the adjacent panel 100 while allowing the connectors 170 of the adjacent panels 100 to move inwardly together with the cables 90. Thus, the cable 90 is only required to have a minimum length for electrical connection of the adjacent panels 100 to thereby gives orderly arranged electric connections and facilitate the installation of the panels 100 on the subfloor 5 or the like surface.

What is claimed is:
1. A floor heating panel comprising:
  a substrate;
  a heating element arranged on the top surface of the substrate;
  a cover layer placed over said heating element to cover the entire top surface of said substrate; and
  a cushioning layer disposed on the bottom surface of said substrate;
  said substrate being formed on its bottom surface with rows of slits by which said substrate is allowed to resiliently flex to a limited extent.
2. A floor heating panel as set forth in claim 1 wherein said heating element is made flexible.
3. A floor heating panel as set forth in claim 1, wherein said heating element comprises an electric resistance heater arranged in a flat flexible configuration and disposed on the top surface of said substrate, and said substrate having a terminal unit for electrical connection of said electric heater to a source of electric power as well as to another heating panel of the like construction.
4. A floor heating panel as set forth in claim 3, wherein said terminal unit is received within a recess formed in said substrate.
5. A floor heating panel comprising:
  a substrate;
  an electric resistance heater arranged in a flat flexible configuration and disposed on the top surface of the substrate;
  a cover layer placed over said flat heating element to cover the entire top surface of said substrate;
  a cushioning layer disposed on the bottom surface of said substrate;
  said substrate having a terminal unit for electrical connection of said electric resistance heater to a source of electric power as well as to another floor heating panel having the same structural configuration, and
  said terminal unit includes at least one connector which is slidable along one dimension of said heating panel and includes lead jacks for receiving conductors leading to the electric source and to the adjacent heating panel of the like configuration.
6. A floor heating panel as set forth in claim 5, wherein said terminal unit is received within a recess formed in said substrate.
7. A floor heating panel as set forth in claim 5, wherein said connector is capable of being held on its outermost position along the one dimension of said heating panel.
8. A floor heating panel as set forth in claim 5, wherein said substrate is in the form of a rectangular configuration having a lengthwise dimension greater than a width dimension, said terminal units including a pair of connectors having lead jacks for receiving conductors leading to the source of electric power and to the adjacent heating panel, each of said connectors being slidably held in said recess formed in the bottom surface of said substrate to be movable along the width dimension thereof and capable of being held in its outermost position, and each of said connector having the lead jacks oriented outwardly in said width dimension so as to be accessible from that direction.
9. A floor heating panel as set forth in claim 8, further including a bottom cover which closes the bottom of said recess and is formed with a guide furrow into which the portion of each connector is slidably received to be guided therealong.

* * * * *